Figure 1:
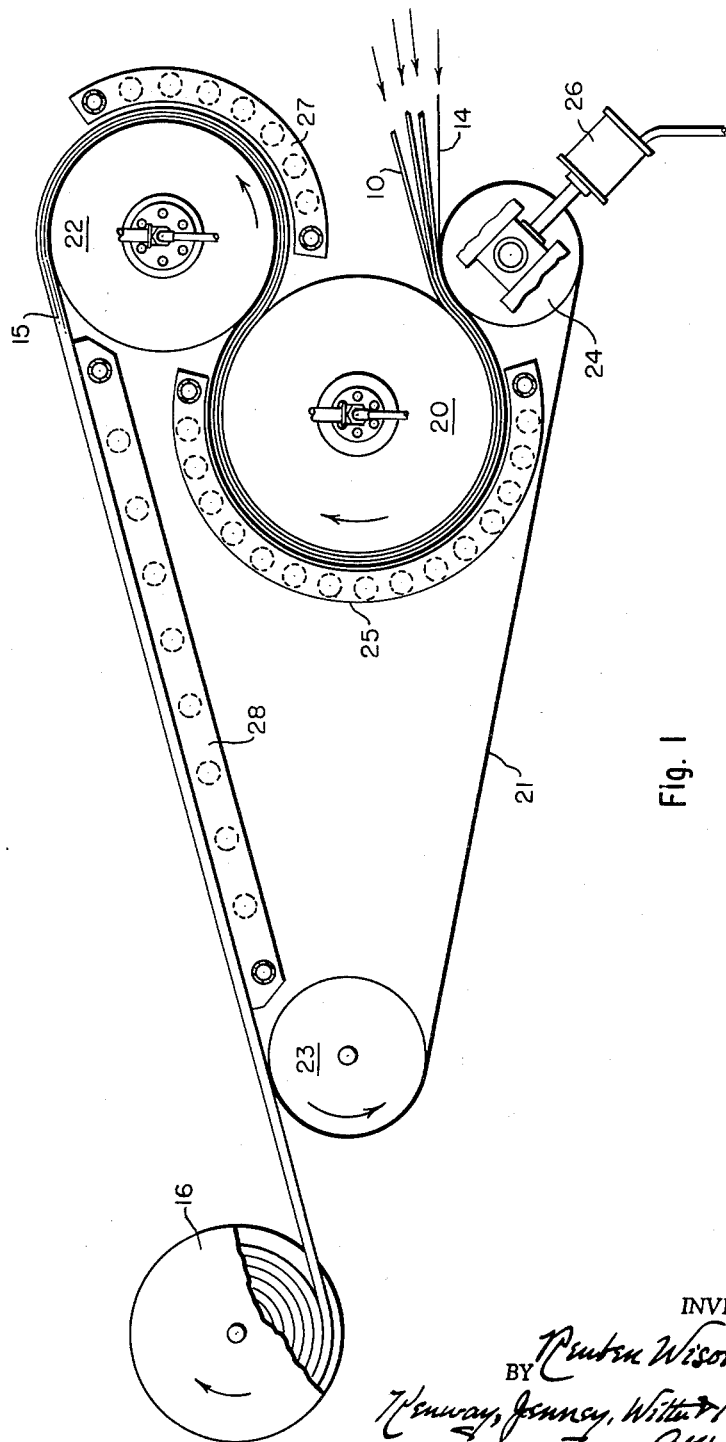

Aug. 7, 1962 R. WISOTZKY 3,048,510
LAMINATED FLOOR AND WALL COVERING
Filed Dec. 2, 1957 2 Sheets-Sheet 1

INVENTOR.
Reuben Wisotzky
BY
Kenway, Jenney, Witter & Hildreth
Att'ys.

3,048,510
LAMINATED FLOOR AND WALL COVERING
Reuben Wisotzky, Natick, Mass., assignor to American
 Biltrite Rubber Co., Inc., Chelsea, Mass., a corporation
 of Delaware
Filed Dec. 2, 1957, Ser. No. 700,136
1 Claim. (Cl. 154—49)

This invention comprises a new and improved type of plastic floor or wall covering which possesses pronounced advantages in respect to both appearance and economy of manufacture over previous types of covering.

Heretofore a wide range of floor and wall covering sheets have been made that present a variety of plain colors, mottled or printed effects, or terrazzo designs. Plastic covering has also been made with mixtures of granular particles of various colors and shapes more or less fully distributed in matrices of various colors and degrees of transparency. Of these, certain transparent or translucent types are highly regarded inasmuch as they closely duplicate some of the rare marbles and particularly those that are partially translucent and give an illusion of depth or three-dimensional effect. This latter type is extremely expensive to produce since a most accurate technical control must be maintained over the color, the chemical and physical properties of the blended granules, the filler material, and the color and degree of transparency of the matrix. In addition, the temperature and time of each step of the process and the plasticity of the ingredients must be very rigidly controlled. The degree of compression and flow during molding is also extremely critical. Unless all these factors are precisely controlled it has been found impossible to reproduce a uniform product in successive runs so that it is impossible to match freshly run sheets with lots which have already been produced.

It is an object of the present invention to produce a plastic covering material in sheet form from thermosetting or thermoplastic resins or from other elastomeric materials including rubber compounds which possess all the advantages of three-dimensional ornamental appearance but at relatively low cost and in such a manner as to obviate the difficulties above mentioned.

The process of its manufacture is characterized by the steps of decorating the surfaces of thin plies of translucent plastic material and then laminating and bonding together a number of the said plies with their decorated surfaces all visible from the same direction and cooperating in presenting an integrated composite design in the finished product as a whole.

In carrying out this novel process the product may be calendered, cast or otherwise sheeted in a succession of thin layers or plies which, when suitably decorated by printing or otherwise, are laminated together in the final product. These plies are components of the finished laminated product and since a close control of the individual relatively thin ply gauge is readily feasible, the overall finished gauge may be regulated with precision to the desired thickness. For example, the overall thickness may be divided into three parts for which a series of calendered matrix sheets is prepared, the thickness of each ply being equal to one-third the desired finished thickness plus any additional thickness required to compensate for stretch or flow during the subsequent bonding and molding step. Each of the three plies is compounded to have a predetermined color and degree of translucency and is then provided with a surface color decoration which eventually is embedded within the body of the finished product. The decoration of the surface or surfaces of the individual plies may be carried out in any well known manner such as spraying, block, screen, roll or flat printing, the character of the ornamenting printing medium being such that upon lamination a strong and permanent bond is formed with the surfaces of the adjacent plies.

The choice of a decorative pattern for the plies is practically unlimited, but in cases where it is desired to simulate the finer types of marble, a cloud-like, well dispersed pattern of varying thickness and color values may be impressed on either or both surfaces of the plies.

The individual printed or decorated plies are now laminated, cured and bonded together by any suitable process for converting them into a composite integrated product. If desired the outer ply may be transparent and have wear-resisting properties. Under these conditions the appearance of the fully bonded product closely simulates that of the rare marbles or similar translucent materials in that the decorative elements are seen at varying depths through the transparent and translucent body of the product.

The inherent tendency of the various plies to stretch during and prior to bonding ordinarily yields a non-repeating pattern of variability and attractiveness and depth. On the other hand, the stretching characteristics of the plies need not be relied upon and very satisfactory results are achieved by impressing on each ply a decorative repeat pattern different from that of the other plies. Under these conditions the adjacent patterns cannot register and they cooperate to present an integrated composite design in the finished product, which is substantially non-repetitive.

If desired geometric or other conventional patterns may be placed on the individual plies with due regard to the accumulative effect of these elements in the laminated product. The product may if desired include one or more plies of textile or other supporting medium and these too may be ornamented or decorated to contribute to the composite design of the product.

Figure 2:
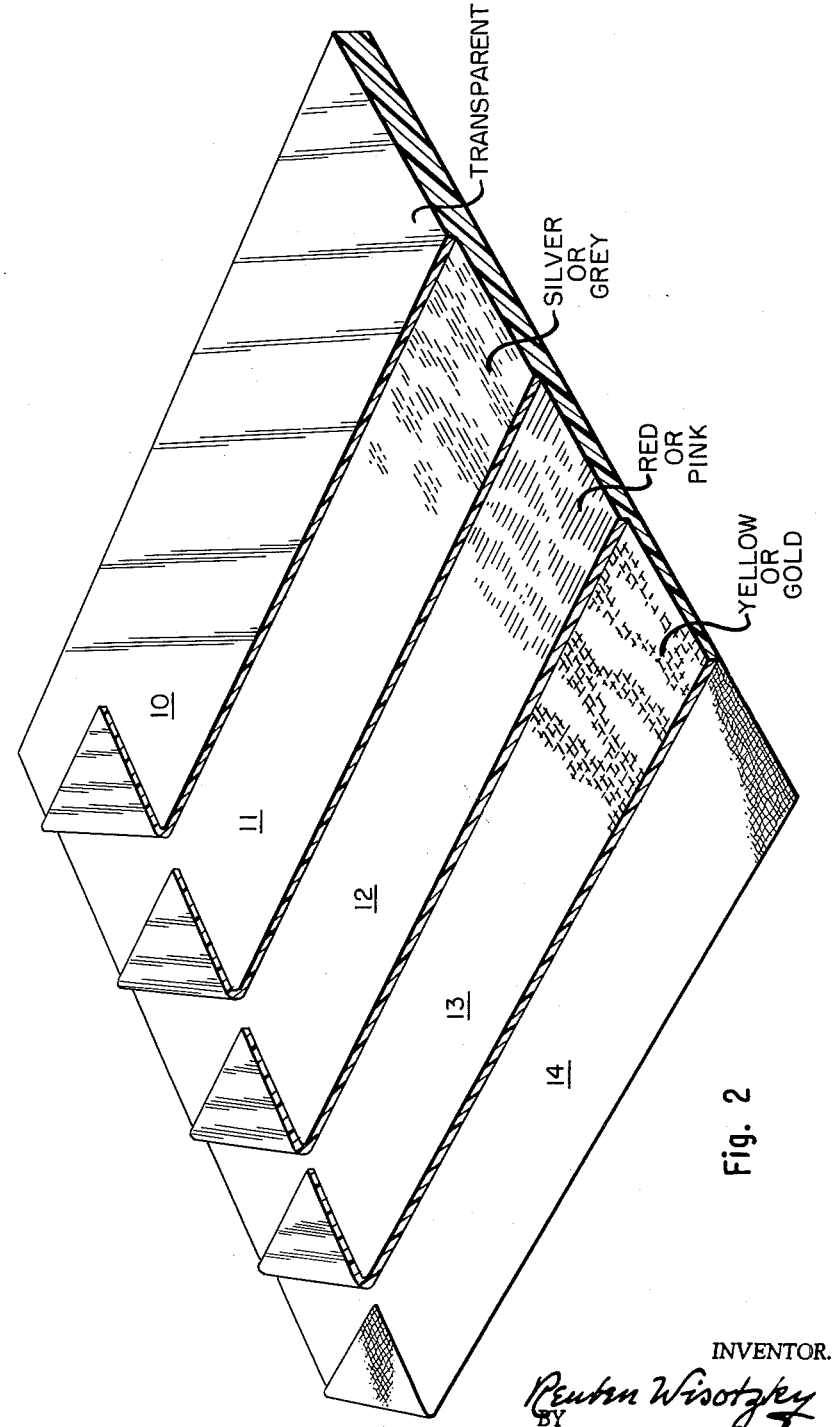

These and other features and characteristics of the invention will be best understood and appreciated from the following description of a preferred manner of carrying out my novel process in the production of typical laminated floor or wall covering embodying the invention and as illustrated in the accompanying drawings in which:

FIG. 1 is a diagrammatic view of one type of machine for laminating and bonding the plies into an integral sheet, and FIG. 2 is a view in perspective of a fragment of the laminated product shown on somewhat enlarged scale.

As shown in FIG. 2 the completed floor or wall covering sheet is composed of five thin plies of which the uppermost ply 10 is of clear transparent vinyl resin compounded to impart wear-resisting property to the laminated sheet as a whole. A satisfactory and typical compound for this ply is

| | |
|---|---|
| Vinyl resin | 100 |
| Primary plasticized (DOP) [1] | 35 |
| Stabilizer (barium-cadmium etc.) | 3 |
| | 138 |

[1] Di-octo-phthalate.

Beneath the ply 10 are placed two intermediate translucent plies 11 and 12 of the same vinyl resin, but in this case the material may be tinted instead of clear and each ply is printed on its upper surface with elements of the desired composite pattern. The decoration of the ply 11 is herein lined to indicate a silver or gray color, and the ply 12 to indicate a red or pink color.

For purposes of this invention it is important to employ a vinyl or other printing ink compatible with vinyl resin in order that the subsequent fusion of the plies may be continuous and not in any way interrupted by an intermediate film of ink. A satisfactory and typical vinyl ink may be compounded as follows:

| | | |
|---|---|---|
| Vinyl polymer | 100 | 100 |
| Methyl methacrylate | 40 | 40 |

| | |
|---|---|
| Methyl ethyl ketone | 600 600 |
| Pigment | 5–100 |
| | 745–840 |

Underlying the intermediate plies 11 and 12 is a fourth ply 13 of vinyl resin and as herein shown this may contain a dispersed dark colored pigment so that it appears substantially opaque. Its upper face may be printed with further elements of the composite design and is herein shown, for example, as lined for the yellow or gold color. A satisfactory and typical composition for the opaque ply 13 is as follows:

| | |
|---|---|
| Vinyl resin | 100 |
| Primary plasticizer | 50 |
| Calcium carbonate | 250 |
| Stabilizer | 3 |
| Pigment | 10 |
| | 413 |

The mixing temperature of this formula will range between 300° and 350° F. for the plies 10—13 and the molding temperature will be aproximately the same.

Finally, and beneath the ply 13, is provided the fifth ply 14 of textile or felted material having two functions in the finished product, viz. that of reinforcing the sheet and of providing a surface that is compatible to adhesive employed in attaching the covering sheet to the floor or wall when it reaches the ultimate consumer. The smooth impervious surface of the vinyl plies renders them poorly cohesive to cements but it has been found that such a textile sheet may be securely bonded to a ply of vinyl resin when the latter is subjected to heat and pressure in the laminating and bonding steps to which the described component plies are subjected. Accordingly, the bottom surface of the finished product readily takes and coheres to any suitable cement that it may be desired to use in installing the finished laminated product.

While it is difficult to calender vinyl resins in sheets of substantial thickness, there is no difficulty in calendering such sheets to a thickness of approximately 0.06″ nor in laminating such sheets after they have been so produced and printed. A satisfactory machine for laminating and bonding the plies into an integral composite sheet is shown in U.S. Patent No. 2,434,541, Bierer, and diagrammatically illustrated in FIG. 1 of the present drawings. It includes in its structure a cylindrical drum 20 and a cooperating endless pressure band 21 which is arranged to pass about a substantial arcuate portion of the drum and from thence in a generally triangular path about a drum 22, a roll 23 and a pressure drum 24. The drum 20 is adapted to be heated by steam and the drum 22 is adapted to be cooled by passing cold water through it. A heating jacket 25 extends arcuately around a portion of the drum 20. The jacket 25 is heated in its encirclement of the drum and band 21. The band is maintained under severe tension by hydraulic mechanism, not shown, acting upon the roll 23, and the position of the pressure roll 24 is controlled by a hydraulic cylinder 26 acting upon the bearing of the roll to force it inwardly at the bite of the roll and drum. The cooling drum 22 is supplemented by a segmental cooler 27, and a long straight cooler 28 extends between the drum 22 and the roll 23 in position to cool the band 21 and the product thereon during this portion of its path. The system may be driven by power applied to the drum 22.

Having calendered and printed the individual plies 10—14 as above explained, they are now introduced in superposed relation into the bite of the drum 20 and the band 21 where they immediately come under heavy pressure of the band at the point where it is backed up and forced radially inwardly toward the drum 20.

The superposed plies are pasesd slowly about the circumference of the hot drum 20 under severe pressure of the band 21 while being heated by the drum and the heater 25 to a fusing, curing, and stress-relieving temperature. Accordingly, the plies leave the drum 20 as an integral composite sheet of the character shown in FIG. 2. The vinyl plies are completely fused together throughout their contacting surfaces and the textile ply 14 is permanently bonded to the under surface of the sheet by the fusion of the next overlying vinyl ply. The sheet now passes about the circumference of the cooling drum 22 being carried upon the surface of the band 21 and relieved of all pressure. It is further cooled in passing from the drum 22 to the roll 23. At that point it is stripped from the band and has hardened sufficiently to be coiled upon a reel 16.

In FIG. 1 the plies 10—14 are shown as introduced with the textile ply 14 next to the band 21 and the vinyl ply 10 next to the heated drum 20, but this order of arrange may be reversed if desired. Also if desired a pressure pad or supplementary band may be employed between the drum and the plies 10—14 as shown, for example, in Patent No. 2,434,541. It is contemplated that such a second band would be employed in case it should be desired to impart to the exposed face of the textile ply a pebbled or relief texture.

It will be understood that the presence of a textile layer such as the ply 14 is a matter of secondary importance and that if desired it is in order to roughen or emboss the bottom surface of the finished covering so as to offer a more effective bonding surface for adhesive.

From the foregoing description, it will be seen that the present invention permits the manufacture in continuous sheet form of a decorative material which is substantially free from repetitive patterns usually found in such sheets, the non-repetitive effect being due to the random deposition of the color decoration when viewed in a direction normal to the laminated sheet. The random deposition is brought about by varying the pattern on print rolls of equal diameter or by varying the diameter of print rolls carrying the same pattern. Further variation results if the decorated surfaces of the plies do not all face in the same direction. In other words, the decoration may be applied to the lower face of one or more plies and to the upper face of other plies.

Having thus disclosed my invention and described in detail the preferred process for producing certain illustrative embodiments thereof, I claim as new and desire to secure by Letters Patent:

A composite laminated floor or wall covering comprising an outer transparent wear-resisting ply of a synthetic vinyl resin, a plurality of thin intermediate plies of differently colored translucent synthetic vinyl resins each being of uniform thickness throughout and having surface decorations formed by areas of vinyl ink visible through the transparent outer ply, a substantially opaque vinyl ply underlying several translucent intermediate plies and having also surface decorations in areas of vinyl ink, all of said plies, including the areas of vinyl ink, being bonded into an integral relatively thick sheet and the outer transparent ply transmitting to the observer a three-dimensional ornamental effect in which is combined the different colors of all the translucent intermediate plies and the reflection of the surface decorations of the substantially opaque ply which underlies them.

References Cited in the file of this patent

UNITED STATES PATENTS

| | | |
|---|---|---|
| 1,985,480 | Carpenter | Dec. 25, 1934 |
| 2,113,158 | Mayer | Apr. 5, 1938 |
| 2,143,141 | Cooley | Jan. 10, 1939 |
| 2,316,746 | Stallings | Apr. 13, 1943 |
| 2,434,541 | Bierer | Jan. 13, 1948 |
| 2,556,798 | Concordet | June 12, 1951 |
| 2,617,750 | Le Clair et al. | Nov. 11, 1952 |
| 2,727,327 | Colby | Dec. 20, 1955 |
| 2,880,464 | Benedict et al. | Apr. 7, 1959 |
| 2,880,541 | Kahn | Apr. 7, 1959 |